(12) United States Patent
Campos et al.

(10) Patent No.: US 10,498,114 B1
(45) Date of Patent: Dec. 3, 2019

(54) ARC RESISTANT DOOR WITH MULTI-LATCH SYSTEM

(71) Applicant: Toshiba International Corporation, Houston, TX (US)

(72) Inventors: Walter Campos, Houston, TX (US); Enrique Martinez, Cypress, TX (US)

(73) Assignee: Toshiba International Corporation, Houston, TX (US)

( * ) Notice: Subject to any disclaimer, the term of this patent is extended or adjusted under 35 U.S.C. 154(b) by 0 days.

(21) Appl. No.: 16/140,690

(22) Filed: Sep. 25, 2018

(51) Int. Cl.
  *H02B 1/38* (2006.01)
  *H02B 1/30* (2006.01)
  *E05C 9/24* (2006.01)
  *E05C 9/18* (2006.01)
  *E05C 19/00* (2006.01)

(52) U.S. Cl.
  CPC .............. *H02B 1/38* (2013.01); *E05C 9/185* (2013.01); *E05C 9/24* (2013.01); *E05C 19/005* (2013.01); *H02B 1/306* (2013.01)

(58) Field of Classification Search
  CPC .......... H02B 1/306; H02B 1/38; E05C 9/185; E05C 9/24; E05C 19/005; E05C 9/002; E05C 9/063; E05C 9/22; E05B 65/001; E05B 47/0012; E05F 15/40
  USPC ................... 218/155, 139; 200/50.13, 50.21
  See application file for complete search history.

(56) References Cited

U.S. PATENT DOCUMENTS

| | | | | |
|---|---|---|---|---|
| 5,470,115 | A * | 11/1995 | Berg | E05B 63/20 292/335 |
| 5,905,244 | A * | 5/1999 | Smith | H02B 11/12 200/50.17 |
| 8,419,141 | B2 * | 4/2013 | Niedzwiecki | E05B 63/24 200/50.15 |
| 9,879,446 | B2 | 1/2018 | Robinson et al. | |
| 2003/0151337 | A1 * | 8/2003 | Leccia | H02B 1/38 312/326 |

* cited by examiner

*Primary Examiner* — Edwin A. Leon
*Assistant Examiner* — William A Bolton
(74) *Attorney, Agent, or Firm* — Baker Botts L.L.P.

(57) ABSTRACT

A door latching system provides an arc resistant door for a power electronics cabinet. The door latching system includes a six point latch to secure the door in place against the frame of the cabinet. The door latching system includes two vertical linkages coupled to a door handle mechanism, the door handle mechanism being able to impart a vertical motion to the vertical linkages as the handle is turned. The latching system allows for this vertical motion to then become horizontal motion for closing several latches between the vertical frame of the cabinet and the door.

18 Claims, 9 Drawing Sheets

ARC RESISTANT DOOR WITH MULTI-LATCH SYSTEM

TECHNICAL FIELD

Embodiments of the present disclosure relate to door latching systems and, more particularly, to a multi-latch system capable of securing a door to withstand internal arc events.

BACKGROUND

Medium-voltage (e.g., greater than 1500 volts) power electronics assemblies, such as control centers and adjustable speed drives, often use groups of power transistors and diodes switched on and off in a predetermined timing sequence to supply the level and frequency of power desired. These power electronics are housed in an enclosure that is sealed via a locking door. Arc faults, where a high amount of electricity is discharged between conductors, can sometimes occur within these power electronics assemblies. These arc faults lead to a large amount of heat and pressure rise within the sealed enclosure. It is desirable for the enclosure to remain sealed throughout such an arc event, to contain any large blast.

Doors used to seal these power electronics enclosures are often equipped with a latching system used to close and lock the door. Unfortunately, existing door latching systems used to provide arc resistance are often bulky and have components that protrude outward from the frame when the door is open. It is now recognized that a need exists for a low profile door latching system that is capable of securing an enclosure door against arc events.

SUMMARY

In accordance with an embodiment of the present disclosure, a door latching system for a door of a power electronics enclosure is provided. The door is pivotally coupled to the power electronics enclosure via a hinge mechanism. The door latching system includes a handle, and first and second linkages coupled to and extending from the handle in opposite directions. The door latching system includes a first rod coupled to and oriented perpendicular to the first linkage, wherein the first rod extends from the first linkage in a direction away from the hinge mechanism. The door latching system also includes a first latching component disposed on the first rod and configured to engage with a complementary component on a first edge of a door frame opposite the hinge mechanism. The door latching system also includes a second rod coupled to and oriented perpendicular to the second linkage, wherein the second rod extends from the second linkage in the direction away from the hinge mechanism. The door latching system further includes a second latching component disposed on the second rod and configured to engage with a complementary component on the first edge of the door frame opposite the hinge mechanism.

In accordance with another embodiment of the present disclosure, a method includes rotating a handle of a door latching system disposed on a door and door frame of a power electronics enclosure, the door being pivotally coupled to the door frame via a hinge mechanism, and causing a first linkage coupled to the door handle to move in a first linear direction away from the handle and a second linkage coupled to the door handle to move in a second linear direction opposite the first linear direction in response to rotation of the handle. The method also includes converting linear movement of the first linkage in the first linear direction into perpendicular linear movement of a first rod coupled to the first linkage in a direction away from the hinge mechanism, the first rod being oriented perpendicular to the first linkage, and converting linear movement of the second linkage in the second linear direction into perpendicular linear movement of a second rod coupled to the second linkage in the direction away from the hinge mechanism, the second rod being oriented perpendicular to the second linkage. The method further includes actuating a first latching mechanism between the first rod and a first edge of the door frame opposite the hinge mechanism via the linear movement of the first rod away from the hinge mechanism, and actuating a second latching mechanism between the second rod and the first edge of the door frame opposite the hinge mechanism via the linear movement of the second rod away from the hinge mechanism.

BRIEF DESCRIPTION OF THE DRAWINGS

For a more complete understanding of the present disclosure and its features and advantages, reference is now made to the following description, taken in conjunction with the accompanying drawings, in which.

DETAILED DESCRIPTION

Illustrative embodiments of the present disclosure are described in detail herein. In the interest of clarity, not all features of an actual implementation are described in this specification. It will of course be appreciated that in the development of any such actual embodiment, numerous implementation specific decisions must be made to achieve developers' specific goals, such as compliance with system related and business related constraints, which will vary from one implementation to another. Moreover, it will be appreciated that such a development effort might be complex and time consuming, but would nevertheless be a routine undertaking for those of ordinary skill in the art having the benefit of the present disclosure. Furthermore, in no way should the following examples be read to limit, or define, the scope of the disclosure.

Disclosed embodiments are directed to a door latching system used to provide an arc resistant door for a power electronics cabinet. The door latching system is designed to withstand the effects from an arc event, should one happen within the cabinet. The arrangement of the door latching system allows for a six point latch to secure the door in place against the frame of the cabinet. The latching system includes two vertical linkages coupled to a door handle mechanism, the door handle mechanism being able to impart a vertical motion to the vertical linkages as the handle is turned. The latching system allows for this vertical motion to then become horizontal motion for closing several latches between the vertical and horizontal frames of the cabinet and the door. The arrangement of the door latching system allows for a slimmer profile on the vertical door frame of the cabinet, which has not been available with existing door latching designs.

Figure 1:
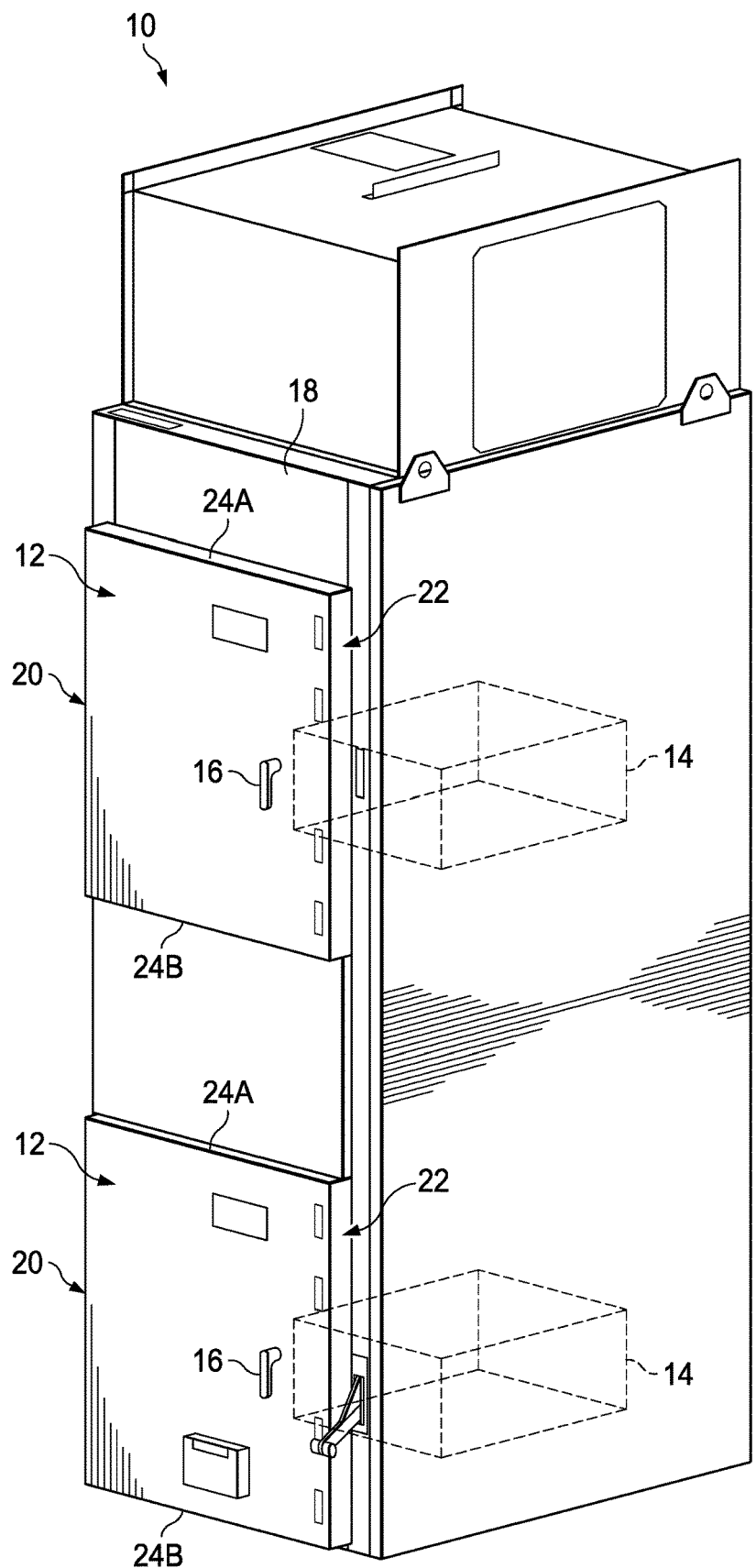
FIG. 1 is a perspective view of a power electronics cabinet utilizing an arc resistant door with a multi-latch system, in accordance with an embodiment of the present disclosure.

Turning now to the drawings, FIG. 1 illustrates a power electronics cabinet 10 or cubicle that may utilize the improved door latching system. The cabinet 10 is an enclosure for various power electronics, which may form part of, for example, a medium-voltage control center or adjustable speed drive. The power electronics enclosed in the cabinet 10 may be used for various other functions as well. The illustrated cabinet 10 includes two doors 12 for accessing the enclosed power electronics 14. These doors 12 may open into separate compartments within the cabinet 10, each compartment enclosing its own power electronics 14 therein. In other embodiments, the doors 12 may open into the same compartment within the cabinet 10. As shown, the doors 12 may each be generally rectangular in shape.

It should be understood by those of ordinary skill in the art that any desired number of doors 12 may be used within a power electronics enclosure such as the cabinet 10 of FIG. 1, and the disclosure is not limited to cabinetry featuring any exact number of doors 12 formed therein. Other embodiments of power electronics cabinetry utilizing the disclosed door latching system may include, for example, one, three, four, five, six, seven, eight, or more doors 12.

Regardless of the number of doors 12 and/or compartments within the cabinet 10, each door 12 includes a door latching system, in accordance with embodiments of the present disclosure. Most of the components of the door latching system are located on a back side or interior portion of the door 12, which cannot be seen in the illustration of FIG. 1. However, one component of the disclosed door latching system is a door handle 16, which extends outward through a front side of the door 12. The handles 16 for both doors 12 are clearly illustrated in FIG. 1.

In FIG. 1, both doors 12 are shown in a closed position. In this closed position, the door blocks an opening formed in an outer housing 18 of the cabinet 10. The cabinet 10 is equipped with a hinge mechanism 20 forming one vertically oriented edge of the opening in the outer housing 18. The hinge mechanism 20 provides a hinge about which the door 12 can rotate relative to the outer housing 18. The hinge mechanism 20 enables the door 12 to be swung open a desired number of degrees about the vertical axis of the hinge so that an operator can access the power electronics 14 housed within the cabinet 10 through the opening in the outer housing 18.

On an opposite side of the door 12 from the hinge mechanism 20, the outer housing 18 includes a vertically oriented door frame 22 to which the door 12 may be latched after it is closed. The vertically oriented door frame 22 may extend slightly outward from the rest of the outer housing 18 to engage with the latching system of the door 12. The outer housing 18 may also include a first horizontally oriented door frame 24A defining an upper edge of the opening in the housing 18 and extending between an upper end of the hinge mechanism 20 and an upper end of the vertically oriented door frame 22. Similarly, the housing 18 may include a second horizontally oriented door frame 24B defining a lower edge of the opening in the housing 18 and extending between a lower end of the hinge mechanism 20 and a lower end of the vertically oriented door frame 22.

It should be noted that in some embodiments, the relative orientations of these portions of the door 12 and housing 18 may be reversed. That is, the door 12 may open upward or downward instead of from side to side relative to the cabinet 10. In such instances, the hinge mechanism 20 and opposing door frame 22 may be oriented in a horizontal direction, instead of vertical, while the other door frames 24A and 24B are oriented vertically. The door latching system in such embodiments may include all the same features of the below described door latching system, but with the components thereof rotated 90 degrees from the illustrated embodiment.

The door 12 may be opened and closed relative to the outer housing 18 via its connection at the hinge mechanism 20. When the door 12 is closed over the opening in the housing 18, the door 12 may then be locked via a turn of the handle 16. An operator may manually turn the handle 16 to actuate the door latching system of the corresponding door 12 when the door 12 is in a closed position. The door latching system is constructed such that it can be easily actuated from an unlatched, unsecured configuration to a latched, secured configuration in response to manual turning of the door handle 16 from the outside.

Figure 2:
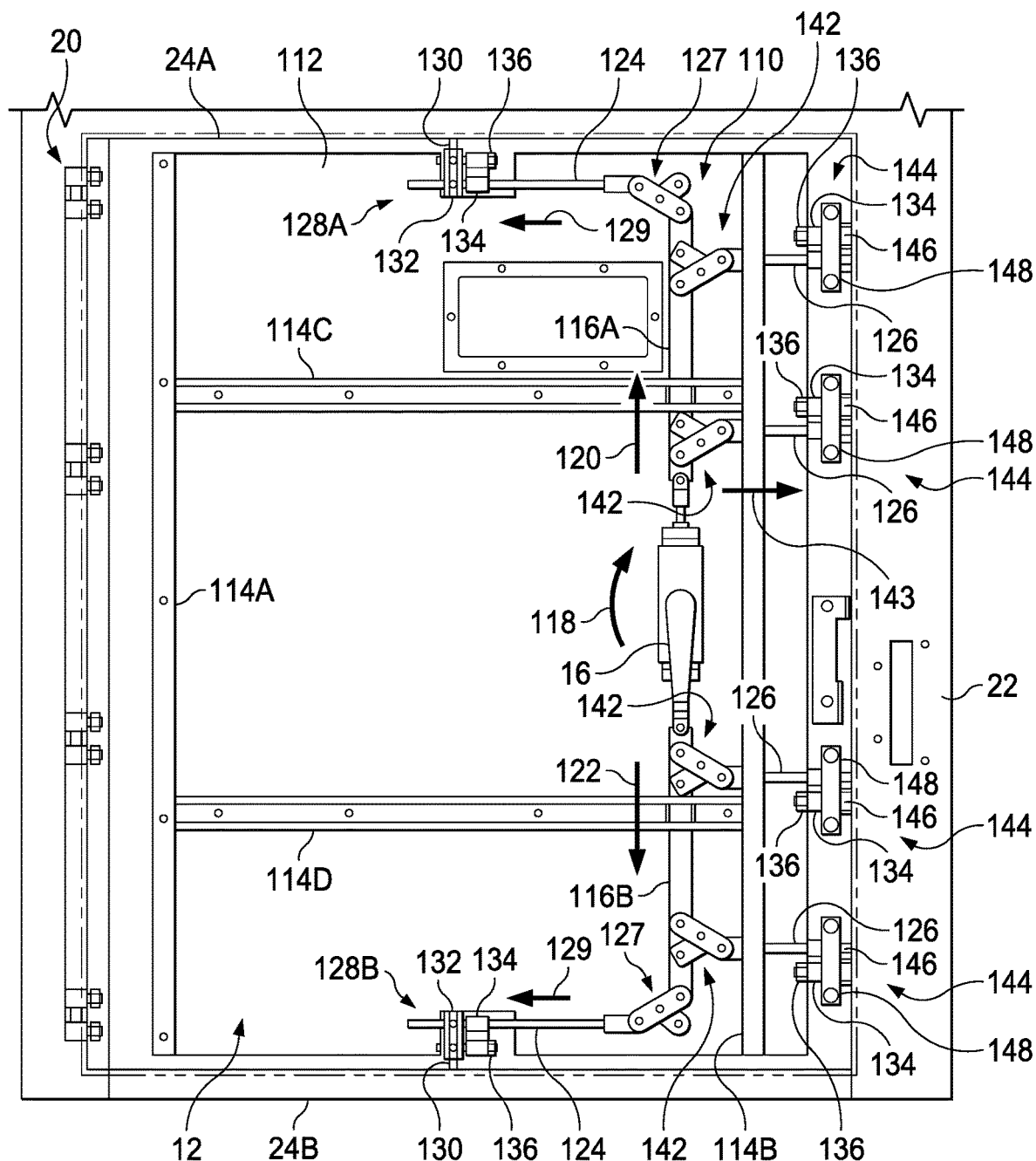
FIG. 2 is a front partial cutaway view of an arc resistant door with a multi-latch system, in accordance with an embodiment of the present disclosure.

A detailed view of the door latching system for the door 12 will now be described. FIG. 2 illustrates the door 12 having a door latching system 110 in accordance with an embodiment of the present disclosure, the door 12 being surrounded by the hinge mechanism 20 on one side, the vertical door frame 22 on the other side, and the two horizontal door frames 24A and 24B at the top and bottom surfaces of the door 12. FIG. 2 shows the door 12 partially cutaway so that a front surface of the door 12 facing out of the drawing page is not shown. However, a back surface 112 of the door 12 is shown, along with the door latching system 110, which may reside at least partially within the door 12 between the front and back surfaces. In the illustrated embodiment, the front surface of the door is removed so that the entire door latching system 110 (instead of just the handle 16) is clearly depicted.

It should be noted that, in other embodiments, the door latching system 110 may be formed entirely on a back side of the door 12, instead of in the middle of the door between front and back surfaces.

As illustrated, the door 12 may include reinforcing structures 114 (e.g., channels) formed along one or more sides of the door 12 to provide increased stiffness to the door 12 so that the door 12 does not deform in response to an arc event. In the illustrated embodiment, for example, the door 12 includes a first vertically oriented reinforcing structure 114A at an end proximate the hinge mechanism 20, a second vertically oriented reinforcing structure 114B at an opposite end proximate the vertical door frame 22, and two horizontally oriented reinforcing structures 114C and 114D extending between these two vertically oriented reinforcing structures 114A and 114B.

The door latching system 110 generally includes the handle 16 coupled directly to two vertically oriented linkages 116. The vertically oriented linkages 116 each extend vertically from the handle 16 in opposite directions; linkage 116A extends upward, while linkage 116B extends downward. The linkages 116 may include rods, brackets, or any other mechanical device that extends vertically from the handle 16. The handle 16 generally includes gearing or some other mechanism for converting rotational force from turning the handle 16 (arrow 118) into opposing vertical movements (arrows 120 and 122) of the linkages 116. Specifically, the upper linkage 116A moves in a vertically upward (120) direction in response to the rotation (118) of the handle 16, while the lower linkage 116B moves in a vertically downward (122) direction in response to the same rotation (118) of the handle 16.

The door latching system 110 also includes a plurality of horizontally oriented linkages 124, 126 coupled to the vertical linkages 116. As illustrated, these horizontal linkages 124, 126 may take the form of rods, each rod extending in a horizontal direction from one of the vertically oriented linkages 116A and 116B. Although six such horizontal rods 124, 126 are illustrated, other numbers of horizontal rods extending from the vertical linkages 116 may be utilized in other embodiments. However, it should be noted that having six connection points for latching the door 12 in the closed position provides arc resistance to the door when it is closed and latched.

Two horizontal rods 124 are located at and coupled to opposite ends (extending away from the handle 16) of the vertically aligned linkages 116. The horizontal rods 124 are connected to the ends of the vertically aligned linkages 116 via mechanical components that automatically convert vertical movement of the linkages 116 into horizontal movement of the corresponding horizontal rods 124 in the direction of the hinge mechanism 20. In the illustrated embodiment, for example, the horizontal rods 124 are connected to the vertical linkages 116 via two Scott Russell mechanical linkages 127 that convert vertical movement (arrow 120, 122) of the linkages 116 into horizontal movement of the rods 124 in the direction (arrows 129) of the hinge mechanism 20. A Scott Russell mechanical linkage (127 and 142) converts linear motion in a first direction to linear motion in a second direction perpendicular to the first direction. The Scott Russell mechanical linkage 127, 142 includes a first link having a first end rotationally coupled to the vertical linkage 116 and an opposite end rotationally coupled to the horizontal rod 124, 126, and a second link having a first end rotationally coupled to the door 12 and a second end rotationally coupled to the first link.

The door latching system 110 locks the door 12 to the upper and lower door frames 24A and 24B via two latching assemblies 128A and 128B, respectively. The latching assemblies 128A and 128B partially include the horizontal rods 124, along with other mechanical components that work together to secure the door 12 tightly against the door frame.

The latching assemblies 128A and 128B each include a bracket 130 that is welded or screwed onto the corresponding door frame portion (24A and 24B, respectively), the bracket 130 having an aperture formed therethrough. The latching assemblies 128A and 128B also each include a U-shaped fork component 132 with two apertures formed therethrough, this U-shaped fork component 132 being coupled directly to the door 12 and not movable with the horizontal rods 124. The latching assemblies 128A and 128B further include a bridge component 134 disposed on the corresponding rod 124 and used to connect the rod 124 to a locking pin 136. The locking pin 136 is shorter than the rod 124, oriented in the same horizontal direction, and connected to the rod 124 at a vertical offset via the bridge component 134. The rod 124 is positioned such that it extends through one of the two apertures in the U-shaped fork component 132. However, the rod 124 is movable in a horizontal direction relative to the U-shaped fork component 132 in response to turning the handle 16 of the door.

Figure 3A:
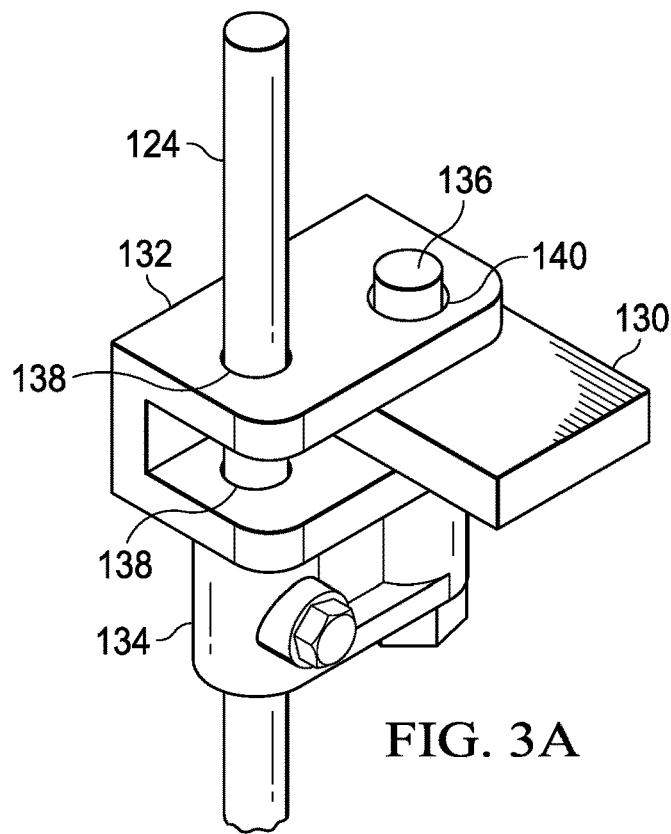
FIG. 3A is a perspective view of a latch assembly that may be used in the multi-latch system of FIG. 2, in accordance with an embodiment of the present disclosure.
Figure 3B:
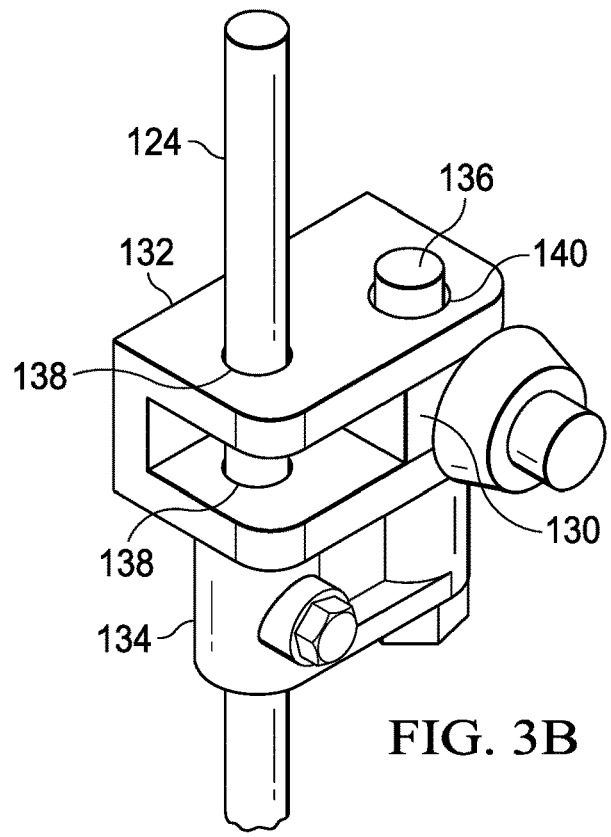
FIG. 3B is a perspective view of a latch assembly that may be used in the multi-latch system of FIG. 2, in accordance with an embodiment of the present disclosure.

More detailed views of two possible embodiments for the latching assembly 128 are provided in FIGS. 3A and 3B. The latching assembly 128 in each of these embodiments is shown in the latched configuration. To get to this latched configuration, the following steps are performed. First the door (12 of FIG. 2) is closed against the housing, thereby bringing the U-shaped fork component 132 affixed to the door toward the bracket 130 that is affixed to the door frame (24 of FIG. 2). At this time, the horizontal rod 124 is extending through a first aperture 138 of the U-shaped fork component 132. However, the locking pin 136 coupled to the horizontal rod 124 is not extending through a second aperture 140 of the U-shaped fork component 132. Upon fully closing the door, the bracket 130 is received into the space between the two arms of the U-shaped fork component 132. Then the door handle (16 of FIG. 2) is turned, causing the horizontal rod 124 to move in a horizontal direction along with the bridge component 134 and locking pin 136 coupled thereto. The rod 124 moves such that the locking pin 136 is positioned through the second aperture 140 of the U-shaped fork component 132 and a corresponding aperture (not shown) formed in the bracket 130. The pin 136, once in this position, locks the door against the door frame. The difference between the embodiments of FIGS. 3A and 3B are that the bracket 130 is configured to be welded to the door frame in FIG. 3A and screwed onto the door frame in FIG. 3B.

Turning back to FIG. 2, four horizontal rods 126 are located at and coupled to various points along the length of the two vertically aligned linkages 116. Two horizontal rods 126 are coupled to the vertically oriented linkage 116A at positions between the handle 16 and the upper end of the linkage 116 (where one mechanical linkage 127 is located). Two horizontal rods 126 are coupled to the vertically oriented linkage 116B at positions between the handle 16 and the lower end of the linkage 116 (where the other mechanical linkage 127 is located). Each of these horizontal rods 126 are connected to their corresponding vertically aligned linkage 116 via mechanical components 142 that automatically convert vertical movement (arrow 120, 122) of the linkages 116 into horizontal movement of the corresponding horizontal rods 124 in a direction (arrow 143) away from the hinge mechanism 20. In the illustrated embodiment, for example, the horizontal rods 126 are connected to the vertical linkages 116 via four Scott Russel mechanical linkages 142 that convert vertical movement of the linkages 116 into horizontal movement in a direction (arrow 143) away from the hinge mechanism 20.

The door latching system 110 locks the door 12 to the vertical door frame 22 via four latching assemblies 144. The latching assemblies 144 partially include the horizontal rods 126, along with other mechanical components that work together to secure the door 12 tightly against the door frame.

The latching assemblies 144 each include a rod insert (or pin cup) 146 that is coupled to the vertical door frame 22, the rod insert 146 having an aperture formed at least partially therethrough. The latching assemblies 144 also each include a rod guide 148 with two apertures formed therethrough, this rod guide 148 being coupled directly to the door 12 and not movable with the horizontal rod 126. The latching assemblies 144 further include a bridge component 134 disposed on the corresponding rod 126 used to connect the rod 126 to a locking pin 136. The locking pin 136 is shorter than the rod 126, oriented in the same horizontal direction, and connected to the rod 126 at a vertical offset via the bridge component 134. The rod 126 is positioned such that it extends through one of the two apertures in the rod guide 148. However, the rod 126 is movable in a horizontal direction relative to the rod guide 148 in response to turning the handle 16 of the door.

Figure 4:
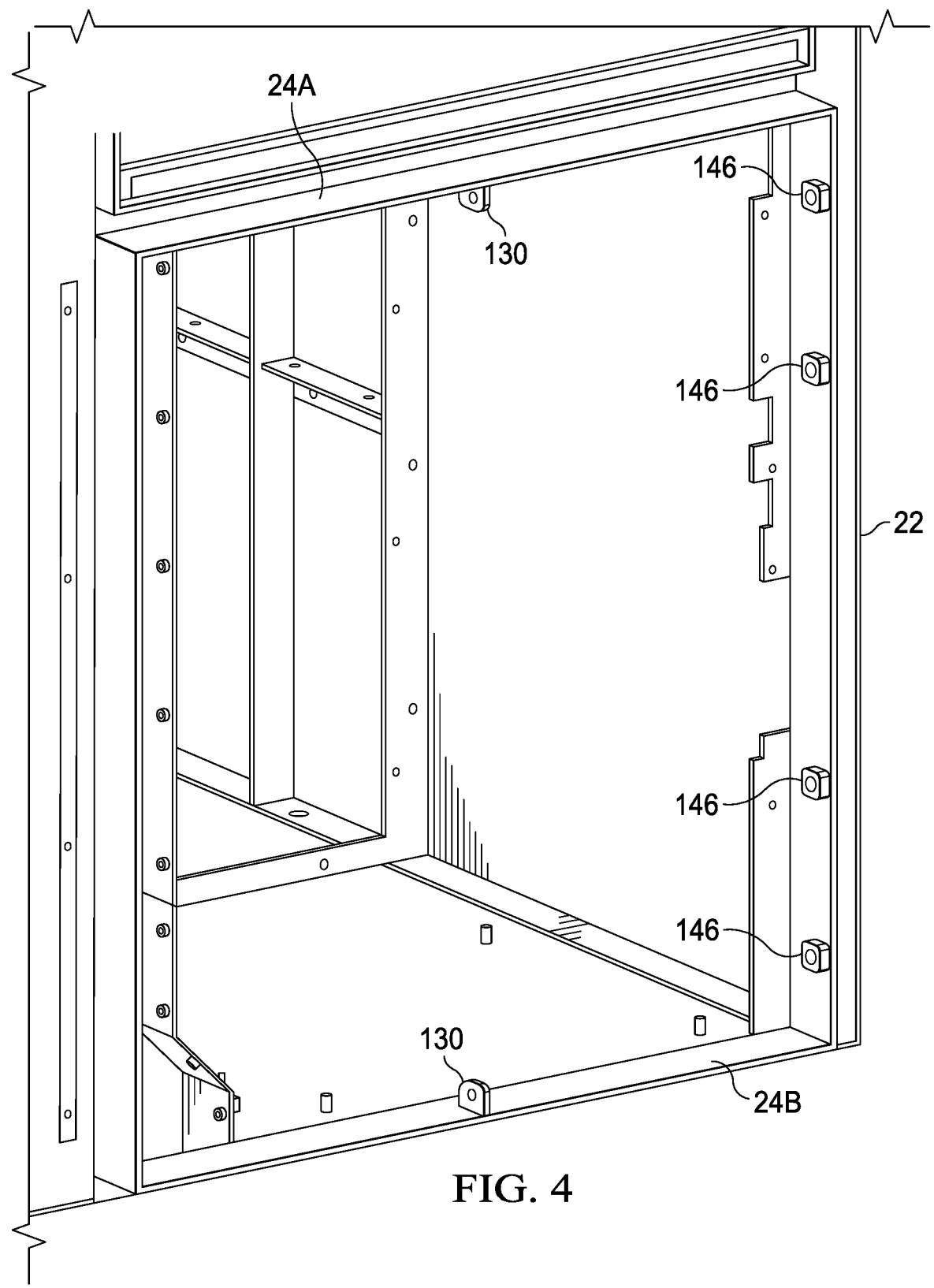
FIG. 4 is a perspective view of a door frame used in the door assembly of FIG. 2, in accordance with an embodiment of the present disclosure.

FIG. 4 illustrates the door frame and components that are fixed thereto, without the door 12 of FIGS. 1-3 present. As shown, the door frame includes the vertical door frame portion 22 on one side and the two horizontal door frame portions 24A and 24B at the top and bottom, respectively. The brackets 130 are mounted to the horizontal door frames 24A and 24B, while the four rod inserts 146 are mounted to the vertical door frame 22. As illustrated, the brackets 130 and rod inserts 146 are generally oriented in the same direction (i.e., in the vertical direction with apertures extending therethrough in a horizontal direction). Having rod inserts 146 that are oriented vertically and mounted to the vertical door frame 22 decreases the profile of the vertical door frame components while still allowing for an arc-resistant 6-point connection for the door. The rod inserts 146 are mounted in a generally flat or planar configuration against the vertical edge of the door frame 22. This low profile at the vertical door frame 22 is beneficial because it allows unimpeded access to the cabinet when the door is opened, since no components are extending outward significantly from the vertical door frame 22. The rod inserts 146 generally function as shallow cups to receive the ends of the corresponding pins (136 of FIG. 3).

Figure 5:
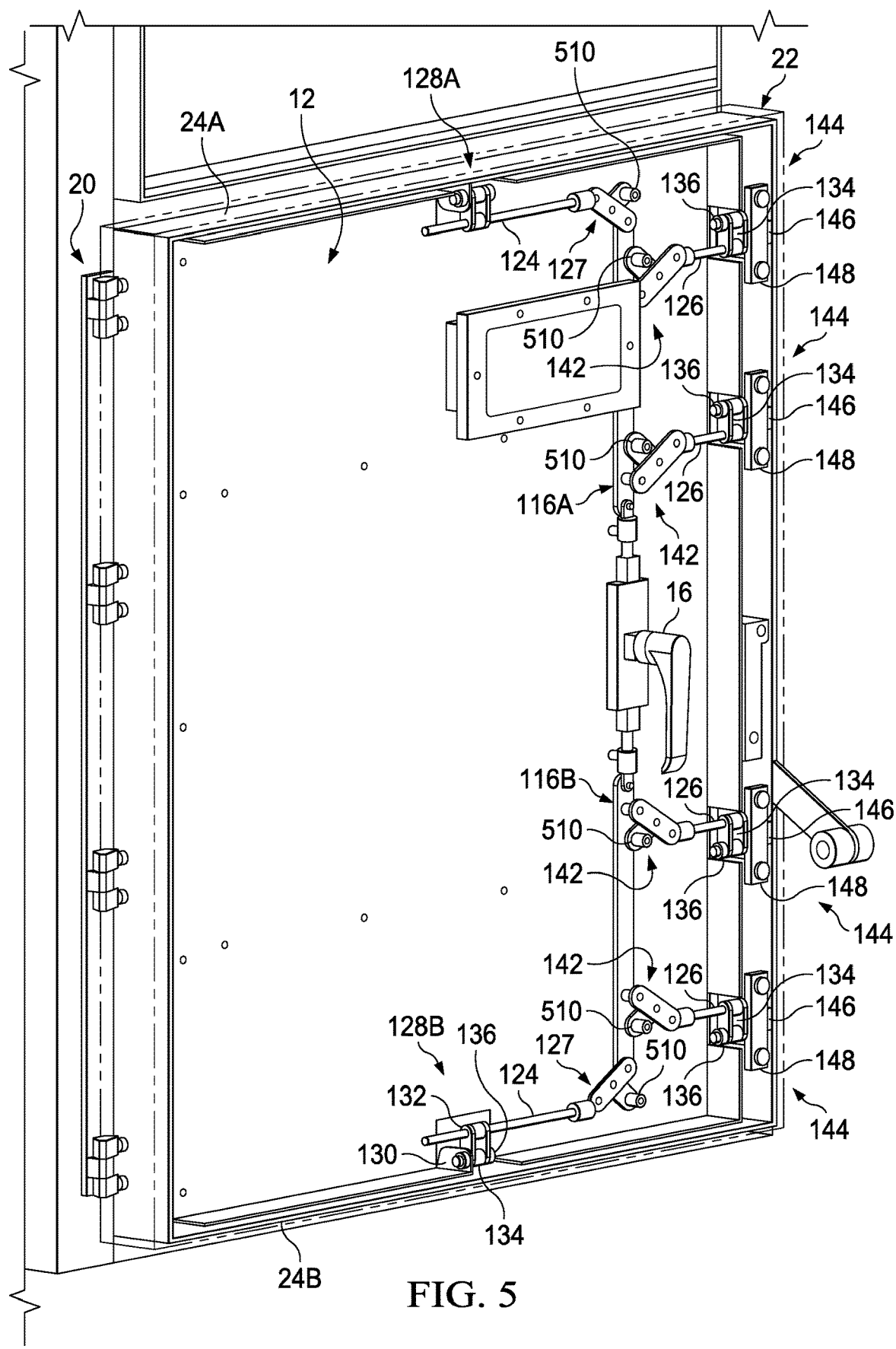
FIG. 5 is a perspective partial cutaway view of an arc resistant door with a multi-latch system, in accordance with an embodiment of the present disclosure.

FIG. 5 illustrates another, more detailed view of the components that make up the door assembly for the arc resistant cabinet. In the illustrated embodiment, the door 12 is in a locked configuration.

Figure 9:
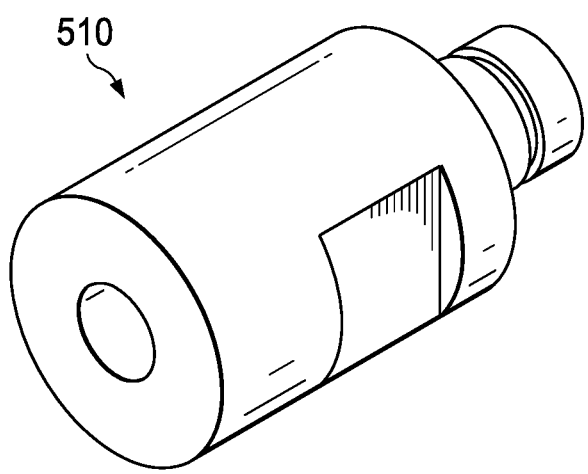
FIG. 9 is a perspective view of a pivot pin used in the multi-latch system of FIG. 5, in accordance with an embodiment of the present disclosure.

As can be seen, the Scott Russell mechanical linkages 127, 142 may include particular vertical-to-horizontal pivot hardware, including a pin 510 that is fixed to the door 12 and enables rotation of a linkage about the pin 510 to convert vertical movement (of 116A or 116B) to horizontal movement (of 124). A more detailed view of the pin 510 for the Scott Russell mechanical linkage (127, 142) is provided in FIG. 9.

Figure 6A:
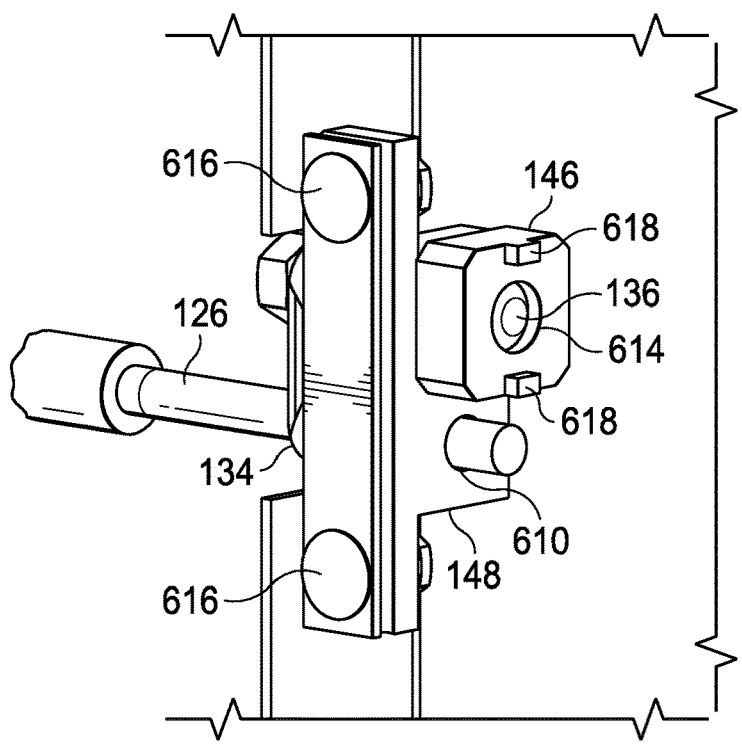
FIGS. 6A and 6B are perspective views of a latching assembly of the multi-latch system of FIG. 5 in a locked configuration and an unlocked configuration, respectively, in accordance with an embodiment of the present disclosure.
Figure 6B:
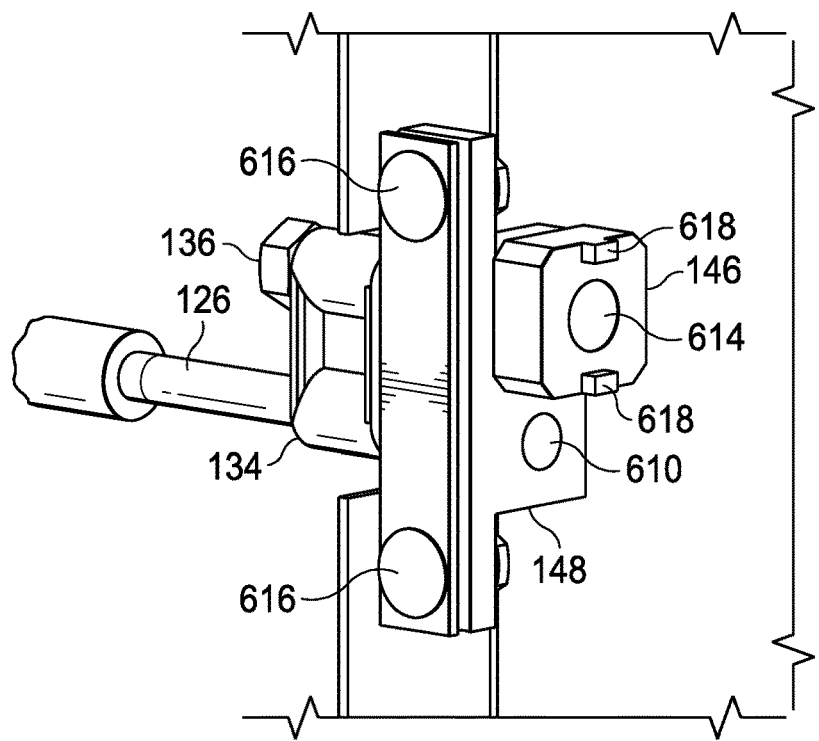
Figure 7A:
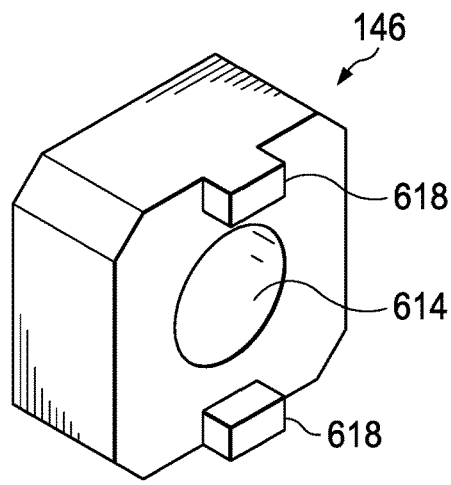
FIGS. 7A-7D are isometric, front, side, and top views of a rod insert of the latching assembly of FIG. 5, in accordance with an embodiment of the present disclosure.
Figure 7B:
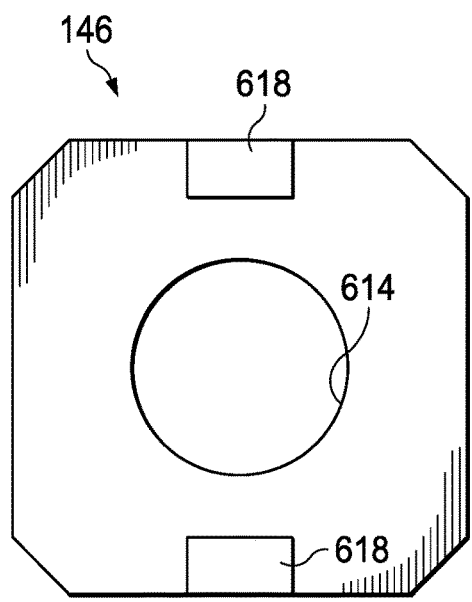
Figure 7C:
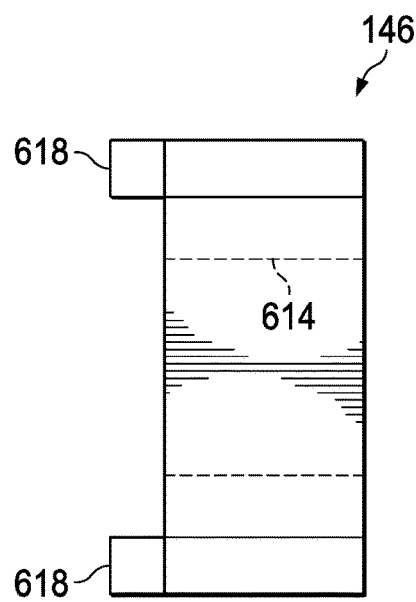
Figure 7D:
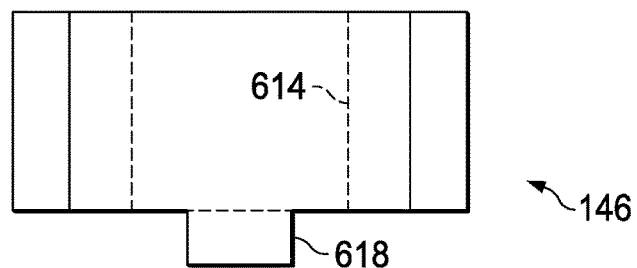
Figure 8A:
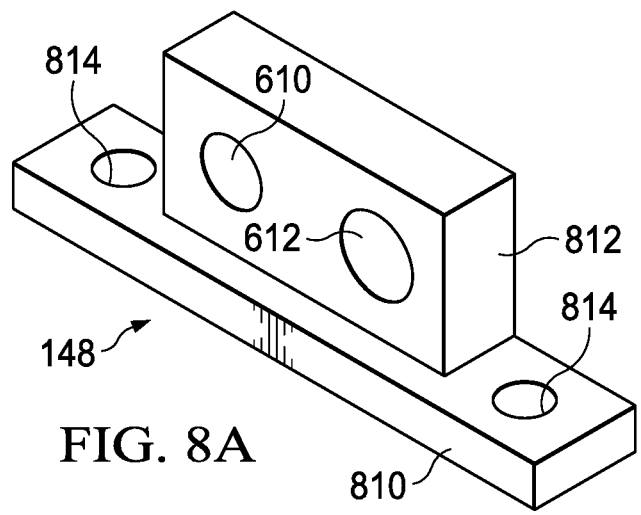
FIGS. 8A-8D are isometric, front, side, and top views of a rod guide of the latching assembly of FIG. 5, in accordance with an embodiment of the present disclosure.
Figure 8B:
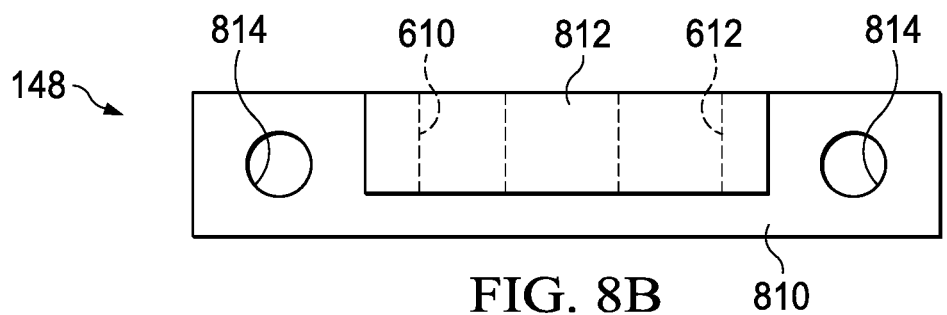
Figure 8C:
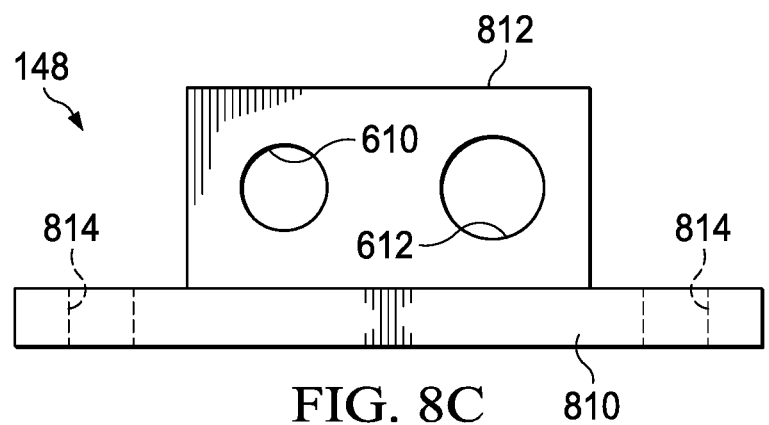
Figure 8D:
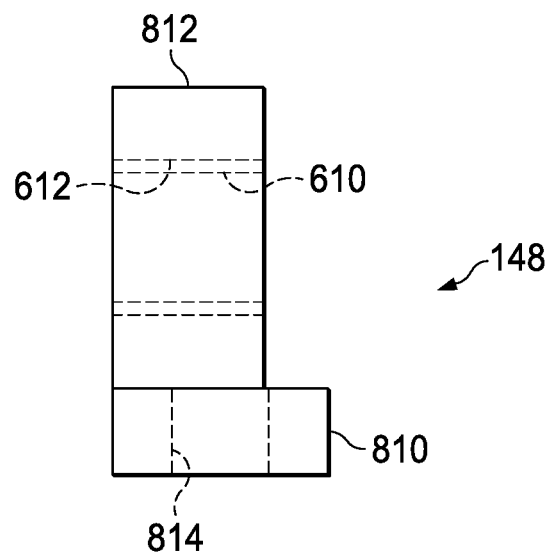

FIGS. 6A and 6B provide a more detailed view of the latching assembly 144 of the disclosed door 12. FIG. 6A shows the latching assembly 144 when the door is locked, and FIG. 6B shows the latching assembly 144 when the door is unlocked. When the latching assembly 144 is engaged (i.e., the door is locked/latched), the rod 126 extends through a first aperture 610 of the rod guide 148. The pin 136 (which is coupled to the rod 126 via the bridge component 134) extends through a second aperture (not visible) of the rod guide 148 and finally is seated in the rod insert 146 coupled to the door frame. The rod insert 146 includes an aperture 614 formed therethrough to receive the pin 136. The rod guide 148 may be mounted to the door via bolts 616 or some other attachment mechanism. The rod insert 146 may be mounted to the door frame via extensions 618 from the rod insert 146 that are press fit or latched into one or more corresponding openings in the door frame.

When the door is unlocked, as shown in FIG. 6B, the rod 126 may remain within the first aperture 610 through the rod guide 148, while the pin 136 is removed from both the second aperture through the rod guide 148 and the aperture 614 through the rod insert 146. From this configuration, the door can be rotated open about its hinge.

FIGS. 7A-7D show a more detailed view of the disclosed rod insert 146, while FIGS. 8A-8D show a more detailed view of the disclosed rod guide 148. As shown, the rod guide 148 may include a bracket portion 810 and a receiving portion 812. The receiving portion 812 extends in a generally orthogonal direction from the bracket portion 810. The receiving portion 812 includes the first aperture 610 for receiving the rod therethrough, and a second aperture 612 for receiving the pin therethrough. The aperture 610 through the rod guide 148 that receives the rod 126 is generally smaller than the aperture 612 through the rod guide 148 that receives the pin 136. The bracket portion 810 connects the receiving portion 812 to the door. The bracket portion 810 may include apertures 814 for receiving bolts to connect the rod guide 148 to the door.

Turning back to FIG. 2, the door latching system 110 includes a handle 16 used to move the vertical linkages 116 outwards from the handle 16 in the vertical direction. This vertical movement in turn moves the rods 126 and corresponding pins 136 towards the non-hinge side of the door 12 where the rod inserts 146 are located on the door frame 22. The vertical arms and horizontal rods (116 and 126) are supported by custom standoff pivot hardware that utilizes a Scott Russell mechanical motion to turn the vertical motion horizontal.

The disclosed door latching system 110 provides a heavy duty door 12 that mitigates the effects from an internal fault within the enclosure. The door 12 is designed to remain closed during a sharp pressure rise in response to an internal fault. The door latching system 110 allows for the turn of one handle 16 to actuate six separate latching assemblies 128, 144 located at different positions along the edges where the door 12 meets the door frame 24, 22. The latching assemblies 144 disposed along the vertical door frame 22 are low profile compared to previous designs. They do not impede access to the enclosure from the outside at times when the door 12 is open.

As illustrated, portions of the back surface 112 of the door 12 may be removed to accommodate the latching assemblies 128 and 144 at the edges of the door 12. The front surface of the door 12, which is not shown in FIG. 2, will cover these spaces to provide an air-tight seal of the enclosure. The gap in the back surface 112 along the edge of the door 12 opposite the hinge mechanism 20 is relatively small due to the low profile of the latching mechanisms 144.

Although the present disclosure and its advantages have been described in detail, it should be understood that various changes, substitutions and alterations can be made herein without departing from the spirit and scope of the disclosure as defined by the following claims.

What is claimed is:
1. A system comprising:
   a door frame surrounding an opening in a power electronics enclosure;
   a door pivotably coupled to the door frame via a hinge mechanism on one side of the door; and a door latching system, comprising:
  a handle;
  first and second linkages coupled to and extending from the handle in opposite directions;
  a first rod coupled to and oriented perpendicular to the first linkage, wherein the first rod extends from the first linkage in a direction away from the hinge mechanism;
  a first latching system comprising a component disposed on the first rod and a complementary component connected to a first edge of the door frame opposite the hinge mechanism;
  a second rod coupled to and oriented perpendicular to the second linkage, wherein the second rod extends from the second linkage in the direction away from the hinge mechanism;
  a second latching system comprising a component disposed on the second rod and a complementary component connected to the first edge of the door frame opposite the hinge mechanism;
  a first linkage mechanism coupling the first rod to the first linkage such that axial movement of the first linkage away from the handle in a first direction causes linear movement of the first rod in the direction away from the hinge mechanism; and
  a second linkage mechanism coupling the second rod to the second linkage such that axial movement of the second linkage away from the handle in a second direction causes linear movement of the second rod in the direction away from the hinge mechanism.

2. The system of claim 1, wherein the door latching system further comprises:
  a third rod coupled to an end of the first linkage distal from the door handle and oriented perpendicular to the first linkage, wherein the third rod extends from the first linkage in a direction toward the hinge mechanism;
  a third latching system comprising a component disposed on the third rod and a complementary component connected to a second edge of the door frame, wherein the second edge of the door frame is disposed between the first edge and the hinge mechanism;
  a fourth rod coupled to an end of the second linkage distal from the door handle and oriented perpendicular to the second linkage, wherein the fourth rod extends from the second linkage in a direction toward the hinge mechanism; and
  a fourth latching system comprising a component disposed on the fourth rod and a complementary component connected to a third edge of the door frame opposite the second edge.

3. The system of claim 2, wherein the door latching system further comprises:
  a fifth rod coupled to and oriented perpendicular to the first linkage, wherein the fifth rod extends from the first linkage in the direction away from the hinge mechanism;
  a fifth latching system comprising a component disposed on the fifth rod and a complementary component connected to the first edge of the door frame;
  a sixth rod coupled to and oriented perpendicular to the second linkage, wherein the sixth rod extends from the second linkage in the direction away from the hinge mechanism; and
  a sixth latching system comprising a component disposed on the sixth rod and a complementary component connected to the first edge of the door frame.

4. The system of claim 1, wherein the first and second linkage mechanisms are both Scott Russell mechanical linkages.

5. The system of claim 1, wherein:
  the first latching system comprises a first pin connected to the first rod and a first cup connected to and extending from the first edge of the door frame to receive the first pin in response to movement of the first rod away from the hinge mechanism; and
  the second latching system comprises a second pin connected to the second rod and a second cup connected to and extending from the first edge of the door frame to receive the second pin in response to movement of the second rod away from the hinge mechanism.

6. The system of claim 5, wherein:
  the first latching system further comprises a first rod guide connected to the door and having a first aperture, wherein the first rod is extending through the first aperture, wherein the first rod guide has a second aperture for receiving the first pin connected to the first rod therethrough, wherein the first rod is movable relative to the first rod guide; and
  the second latching system further comprises a second rod guide connected to the door and having a first aperture, wherein the second rod is extending through the first aperture, wherein the second rod guide has a second aperture for receiving the second pin connected to the second rod therethrough, wherein the second rod is movable relative to the second rod guide.

7. A door latching system for a door of a power electronics enclosure, the door being pivotally coupled to the power electronics enclosure via a hinge mechanism, the door latching system comprising:
  a handle;
  first and second linkages coupled to and extending from the handle in opposite directions;
  a first rod coupled to and oriented perpendicular to the first linkage, wherein the first rod extends from the first linkage in a direction away from the hinge mechanism;
  a first latching component disposed on the first rod and configured to engage with a complementary component on a first edge of a door frame opposite the hinge mechanism;
  a second rod coupled to and oriented perpendicular to the second linkage, wherein the second rod extends from the second linkage in the direction away from the hinge mechanism;
  a second latching component disposed on the second rod and configured to engage with a complementary component on the first edge of the door frame opposite the hinge mechanism;
  a first linkage mechanism coupling the first rod to the first linkage such that axial movement of the first linkage away from the handle in a first direction causes linear movement of the first rod in the direction away from the hinge mechanism; and
  a second linkage mechanism coupling the second rod to the second linkage such that axial movement of the second linkage away from the handle in a second direction causes linear movement of the second rod in the direction away from the hinge mechanism.

8. The door latching system of claim 7, further comprising:
  a third rod coupled to an end of the first linkage distal from the door handle and oriented perpendicular to the first linkage, wherein the third rod extends from the first linkage in a direction toward the hinge mechanism;

a third latching component disposed on the third rod and configured to engage with a complementary component on a second edge of the door frame disposed between the first edge and the hinge mechanism;

a fourth rod coupled to an end of the second linkage distal from the door handle and oriented perpendicular to the second linkage, wherein the fourth rod extends from the second linkage in a direction toward the hinge mechanism; and a fourth latching component disposed on the fourth rod and configured to engage with a complementary component on a third edge of the door frame opposite the second edge.

9. The door latching system of claim 8, further comprising:
a fifth rod coupled to and oriented perpendicular to the first linkage, wherein the fifth rod extends from the first linkage in the direction away from the hinge mechanism;
a fifth latching component disposed on the fifth rod and configured to engage with a complementary component on the first edge of the door frame;
a sixth rod coupled to and oriented perpendicular to the second linkage, wherein the sixth rod extends from the second linkage in the direction away from the hinge mechanism; and
a sixth latching component disposed on the sixth rod and configured to engage with a complementary component on the first edge of the door frame.

10. The door latching system of claim 7, wherein the first and second linkage mechanisms are both Scott Russell mechanical linkages.

11. The door latching system of claim 7, wherein:
the first latching component comprises a first pin connected to the first rod and configured to engage a first cup on the first edge of the door frame in response to movement of the first rod away from the hinge mechanism; and
the second latching component comprises a second pin connected to the second rod and configured to engage a second cup on the first edge of the door frame in response to movement of the second rod away from the hinge mechanism.

12. A method, comprising:
rotating a handle disposed on a door of a power electronics enclosure, the door being pivotally coupled to a door frame of the power electronics enclosure via a hinge mechanism;
causing a first linkage coupled to the door handle to move in a first linear direction away from the handle and a second linkage coupled to the door handle to move in a second linear direction opposite the first linear direction in response to rotation of the handle;
converting linear movement of the first linkage in the first linear direction into perpendicular linear movement of a first rod coupled to the first linkage in a direction away from the hinge mechanism via a first linkage mechanism coupling the first rod to the first linkage, the first rod being oriented perpendicular to the first linkage;
converting linear movement of the second linkage in the second linear direction into perpendicular linear movement of a second rod coupled to the second linkage in the direction away from the hinge mechanism via a second linkage mechanism coupling the second rod to the second linkage, the second rod being oriented perpendicular to the second linkage;

actuating a first latching mechanism between the first rod and a first edge of the door frame opposite the hinge mechanism via the movement of the first rod away from the hinge mechanism; and actuating a second latching mechanism between the second rod and the first edge of the door frame opposite the hinge mechanism via the movement of the second rod away from the hinge mechanism.

13. The method of claim 12, further comprising:
converting linear movement of the first linkage in the first linear direction into perpendicular movement of a third rod coupled to an end of the first linkage in a direction toward the hinge mechanism, the third rod being oriented perpendicular to the first linkage;
converting linear movement of the second linkage in the second linear direction into perpendicular movement of a fourth rod coupled to an end of the second linkage in the direction toward the hinge mechanism, the fourth rod being oriented perpendicular to the second linkage;
actuating a third latching mechanism between the third rod and a second edge of the door frame via the movement of the third rod toward the hinge mechanism, the second edge of the door frame being disposed between the first edge and the hinge mechanism; and
actuating a fourth latching mechanism between the fourth rod and a third edge of the door frame via the movement of the fourth rod toward the hinge mechanism, the third edge of the door frame being opposite the second edge.

14. The method of claim 13, further comprising:
converting linear movement of the first linkage in the first linear direction into perpendicular movement of a fifth rod coupled to the first linkage in a direction away from the hinge mechanism, the fifth rod being oriented perpendicular to the first linkage;
converting linear movement of the second linkage in the second linear direction into perpendicular movement of a sixth rod coupled to the second linkage in the direction away from the hinge mechanism, the sixth rod being oriented perpendicular to the second linkage;
actuating a fifth latching mechanism between the fifth rod and the first edge of the door frame via the movement of the fifth rod away from the hinge mechanism; and
actuating a sixth latching mechanism between the sixth rod and the first edge of the door frame via the movement of the sixth rod away from the hinge mechanism.

15. The method of claim 12, wherein:
the first linkage mechanism is a Scott Russell mechanical linkage coupled between the first linkage, the first rod, and the door; and
the second linkage mechanism is a Scott Russell mechanical linkage coupled between the second linkage, the second rod, and the door.

16. The method of claim 12, wherein:
actuating the first latching mechanism comprises receiving a first pin connected to the first rod into a first cup connected to the first edge of the door frame in response to movement of the first rod away from the hinge mechanism; and
actuating the second latching mechanism comprises receiving a second pin connected to the second rod into a second cup connected to the first edge of the door frame in response to movement of the second rod away from the hinge mechanism.

17. The method of claim 16, further comprising:
- bringing a first rod guide connected to the door into alignment with the first cup as the door is closed, wherein the first rod is extending through a first aperture in the first rod guide;
- actuating the first latching mechanism by receiving the first pin through a second aperture in the first rod guide and into the first cup in response to movement of the first rod away from the hinge mechanism;
- bringing a second rod guide connected to the door into alignment with the second cup as the door is closed, wherein the second rod is extending through a first aperture in the second rod guide; and
- actuating the second latching mechanism by receiving the second pin through a second aperture in the second rod guide and into the second cup in response to movement of the second rod away from the hinge mechanism.

18. The method of claim 12, wherein the first and second cups are mounted in a generally flat or planar configuration against the first edge of the door frame.

\* \* \* \* \*